(12) United States Patent
Pike et al.

(10) Patent No.: US 6,678,082 B2
(45) Date of Patent: Jan. 13, 2004

(54) ELECTRO-OPTICAL COMPONENT INCLUDING A FLUORINATED POLY (PHENYLENE ETHER KETONE) PROTECTIVE COATING AND RELATED METHODS

(75) Inventors: Randy T. Pike, Indian Harbour Beach, FL (US); Calvin Lee Adkins, Malabar, FL (US); Charles E. Bryant, Fellsmere, FL (US)

(73) Assignee: Harris Corporation, Melbourne, FL (US)

( * ) Notice: Subject to any disclaimer, the term of this patent is extended or adjusted under 35 U.S.C. 154(b) by 7 days.

(21) Appl. No.: 09/952,456

(22) Filed: Sep. 12, 2001

(65) Prior Publication Data

US 2003/0048518 A1 Mar. 13, 2003

(51) Int. Cl.[7] .................................................. G02F 1/03
(52) U.S. Cl. ....................... 359/245; 359/315; 359/322; 359/900
(58) Field of Search ................................. 359/245, 246, 359/251, 252, 254, 255, 256, 239, 315, 322, 323, 900; 385/8, 2, 3; 372/12

(56) References Cited

U.S. PATENT DOCUMENTS

| | | | |
|---|---|---|---|
| 4,533,593 A | 8/1985 | Miyata et al. | 428/215 |
| 4,902,769 A | 2/1990 | Cassidy et al. | 528/125 |
| 4,978,437 A | 12/1990 | Wirz | 204/192.23 |
| 5,138,485 A | 8/1992 | Ishida et al. | 359/359 |
| 5,340,607 A | 8/1994 | Friz et al. | 427/162 |
| 5,346,600 A | 9/1994 | Nieh et al. | 204/192.3 |
| 5,415,946 A | 5/1995 | Friz | 428/697 |
| 5,461,395 A | * 10/1995 | Stein | 345/60 |
| 5,646,976 A | 7/1997 | Gutman | 378/84 |
| 5,652,476 A | 7/1997 | Matsuda et al. | 313/478 |
| 5,656,138 A | 8/1997 | Scobey et al. | 204/192.12 |
| 5,670,030 A | 9/1997 | Solberg et al. | 204/192.26 |
| 5,680,412 A | 10/1997 | DeMaria et al. | 372/92 |
| 5,698,266 A | 12/1997 | Floch et al. | 427/376.2 |
| 5,729,323 A | 3/1998 | Arden et al. | 351/163 |
| 5,729,341 A | 3/1998 | Hovis et al. | 356/244 |
| 5,729,645 A | 3/1998 | Garito et al. | 385/127 |
| 5,733,483 A | 3/1998 | Soane et al. | 264/1.7 |

(List continued on next page.)

OTHER PUBLICATIONS

Tullos et al., *Polymers Derived from Hexafluoroacetone: 12F–Poly(etherketone)*, Macromolecules, vol. 24, No. 23, 1991, pp. 6059–6064.

*Fluorinated Poly(Phenylene Ether Ketones)*, Nasa Tech Brief, Nov. 1994, vol. 18, Issue 11, p. 74.

Primary Examiner—Hung Xuan Dang
Assistant Examiner—Tuyen Tra
(74) Attorney, Agent, or Firm—Allen, Dyer, Doppelt, Milbrath & Gilchrist, P.A.

(57) ABSTRACT

A method for applying a protective coating to an electro-optical component includes positioning the electro-optical component in a chamber and applying a coating composition to at least one surface of the electro-optical component to form the protective coating thereon. The coating composition may include fluorinated poly(phenylene ether ketone) and an anti-reflection agent. The anti-reflection agent may include at least one of an inorganic salt, an organofunctionalized additive, and an erbium dopant, for example.

43 Claims, 3 Drawing Sheets

U.S. PATENT DOCUMENTS

| | | | |
|---|---|---|---|
| 5,734,503 A | 3/1998 | Szipócs et al. | 359/584 |
| 5,750,210 A | 5/1998 | Schmidt et al. | 427/577 |
| 5,753,379 A | 5/1998 | Gibson et al. | 428/699 |
| 5,757,882 A | 5/1998 | Gutman | 378/84 |
| 5,760,910 A | 6/1998 | Lepper, Jr. et al. | 356/416 |
| 5,783,371 A | 7/1998 | Bifano | 430/321 |
| 5,785,756 A | 7/1998 | Lee | 117/105 |
| 5,789,040 A | 8/1998 | Martinu et al. | 427/575 |
| 5,882,773 A | 3/1999 | Chow et al. | 428/212 |
| 5,888,593 A | 3/1999 | Petrmichl et al. | 427/563 |
| 5,928,713 A | 7/1999 | Haaland et al. | 427/10 |
| 5,930,046 A | 7/1999 | Solberg et al. | 359/580 |
| 5,940,182 A | 8/1999 | Lepper, Jr. et al. | 356/416 |
| 5,953,446 A | 9/1999 | Opsal et al. | 382/141 |
| 5,959,762 A | 9/1999 | Bandettini et al. | 359/265 |
| 5,982,545 A | 11/1999 | Su | 359/569 |
| 5,989,693 A | 11/1999 | Yamasaki et al. | 428/216 |
| 5,993,898 A | 11/1999 | Nagatsuka | 427/162 |
| 5,993,981 A | 11/1999 | Askinazi et al. | 428/699 |
| 6,017,581 A | 1/2000 | Hooker et al. | 427/166 |
| 6,025,013 A | 2/2000 | Heming et al. | 427/9 |
| 6,067,189 A | 5/2000 | Gillich | 359/359 |
| 6,087,014 A | 7/2000 | Dombrowski | 428/432 |
| 6,099,283 A | 8/2000 | Soane et al. | 425/123 |
| 6,108,121 A | 8/2000 | Mansell et al. | 359/291 |
| 6,132,563 A | 10/2000 | Frach et al. | 204/192.13 |
| 6,134,842 A | 10/2000 | Cheng et al. | 52/1 |
| 6,156,394 A | 12/2000 | Schultz Yamasaki et al. | 427/536 |
| 6,157,025 A | 12/2000 | Katagiri et al. | 250/226 |
| 6,248,398 B1 | 6/2001 | Talieh et al. | 427/420 |
| 6,291,779 B1 | 9/2001 | Lubert et al. | 174/265 |
| 6,306,688 B1 | 10/2001 | Lunceford | 438/127 |
| 6,372,700 B1 | 4/2002 | Zazerra et al. | 510/175 |

* cited by examiner

ELECTRO-OPTICAL COMPONENT INCLUDING A FLUORINATED POLY (PHENYLENE ETHER KETONE) PROTECTIVE COATING AND RELATED METHODS

FIELD OF THE INVENTION

The present invention relates to the field of electro-optical components, and more particularly, to protective coatings therefor.

BACKGROUND OF THE INVENTION

The ever increasing usage of the Internet, teleconferencing, etc. are driving the need for faster methods of data communication that can handle high bandwidth signal transfer. Optical communication, such as through the use of photonics over fiber optic networks, for example, is one communication method which is becoming more prevalent as a result.

With the development and implementation of optical communications networks has come the need for smaller and more reliable optical components. For example, electro-optical components such as micro-optoelectromechanical systems (MOEMS) are now being produced for switching and routing photonic broadband data streams. Yet, a MOEMS may require several million mirrors or more to be used in certain optical networks. Such components must be reliable and able to operate in hostile environmental conditions which may otherwise degrade mirrors, switches, and optical performance, as well as the mechanical operation of hinges, address and landing electrodes on such components.

Accordingly, packaging is an important consideration in the manufacture of MOEMS and other miniaturized electro-optical components. Such packaging typically needs to protect the component from atmospheric contaminants such as moisture and subatomic particles. As a result, the component may require a protective coating to reduce occurrences of corrosion or stiction caused by water vapor, for example. Typical prior art coatings include those produced by inorganic chemical vapor deposition (e.g., $MgF_2$, $MgPO_4$, SiN, SiON, $SIF_4$), parylene type N, C, D, and F silicones (such as DC 1900 manufactured by the Dow Chemical Company of Midland, Mich.), and fluoroacrylics (such as FC-722 manufactured by the Minnesota Mining & Manufacturing Company of St. Paul, Minn.).

Unfortunately, the above prior art coatings typically suffer from one or more drawbacks such as high cost, reliability, and the inability to allow re-working of the component. Further, such coatings may not be able to provide non-hermetic and conformal coatings, which may be required in certain applications.

One promising coating material which has been used in various large scale applications to address these drawbacks is fluorinated poly(phenylene ether ketone), or 12F-PEK. This material is disclosed in U.S. Pat. No. 4,902,769 to Cassidy et al, which is hereby incorporated herein in its entirety by reference. By way of example, an article entitled Fluorinated Poly(Phenylene Ether Ketones) by St. Clair et al. (NASA Tech Brief, November 1994, vol. 18, Issue 11, page 74) notes that 1.2F-PEK may be well suited for use as film and coating material in electronic and thermal-control applications. More specifically, the article lists such applications as passivant insulating coats and interlevel dielectrics in microelectronic circuits, or as protective transparent coats on solar cells or mirrors.

The above article further notes that 12F-PEK is a colorless, transparent, and has a low-dielectric constant. Even so, 12F-PEK may still not be sufficiently transparent for use with MOEMS and other miniaturized electro-optical components.

SUMMARY OF THE INVENTION

In view of the foregoing background, it is therefore an object of the invention to provide an electro-optical component including a protective coating and associated methods that provides adequate transparency, reliability, and that allows for re-working of the electro-optical component.

This and other objects, features, and advantages in accordance with the present invention are provided by a method for applying a protective coating to an electro-optical component including positioning the electro-optical component in a chamber and applying a coating composition to at least one surface of the electro-optical component to form the protective coating. The coating composition may include fluorinated poly(phenylene ether ketone) and an anti-reflection agent. The coating composition may further include a solvent for facilitating the application thereof.

More specifically, applying the coating composition may include at least one of spray coating and spin coating. In particular, the chamber may be a vacuum chamber, for example, and the vacuum chamber may be evacuated and the electro-optical component spray coated therein. Preferably, the coating composition is applied to form a conformal protective coating on substantially the entire at least one surface.

Furthermore, the anti-reflection agent may include at least one of an inorganic salt, an organofunctionalized additive, and an erbium dopant. A thickness of the protective coating may be less than about 25 $\mu$m, for example. Additionally, the electro-optical component may include at least one of a micro-optoelectromechanical system (MOEMS), a vertical-cavity surface-emitting laser (VCSEL), an optical switch, a mirror array, an optic router, an optical wavelength conditioner, an optical transmitter, an optical receiver, an optical transceiver, a laser diode, a holographic grating, a diffraction grating, and a lens. The at least one surface of the electro-optical component may also be non-planar.

The method may further include cleaning the at least one surface prior to applying the coating composition and heating the electro-optical component during application of the coating composition. More particularly, the heating may be performed at a temperature in a range of about 25 to 100° C. Additionally, the protective coating of the electro-optical component may be cured in the chamber for a predetermined time and at a predetermined temperature.

Another method aspect of the invention is for re-working an electro-optical component including a 12F-PEK protective coating thereon. The method may include removing the 12F-PEK protective coating to expose at least one portion of the electro-optical component, and applying a coating composition including 12F-PEK to the at least one exposed portion of the electro-optical component. The coating composition and its application may be similar to that described above.

An electro-optical component according to the invention includes a substrate and at least one electro-optical device thereon, and a protective coating on the substrate and the at least one electro-optical device comprising fluorinated poly (phenylene ether ketone) and an anti-reflection agent. The anti-reflection agent may include at least one of an inorganic salt, an organofunctionalized additive, and an erbium dopant. The protective coating may have a thickness of less than about 3 µm, for example.

Further, the at least one electro-optical device may have a non-planar surface, and the protective coating may substantially cover the non-planar surface. Also, the electro-optical device may be at least one of a micro-optoelectromechanical system (MOEMS), a vertical-cavity surface-emitting laser (VCSEL), an optical switch, a mirror array, an optic router, an optical wavelength conditioner, an optical transmitter, an optical receiver, an optical transceiver, a laser diode, a holographic grating, a diffraction grating, and a lens.

A coating for an electro-optical component according to the invention is also provided. The coating may include a solvent, fluorinated poly(phenylene ether ketone), and an anti-reflection agent. More specifically, the coating may include about 2 to 8.5% by weight of the fluorinated poly(phenylene ether ketone) and about 1.0 to 6.0% by weight of the anti-reflection agent. Further, the anti-reflection agent may include at least one of an inorganic salt, an organofunctionalized additive, and an erbium dopant.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
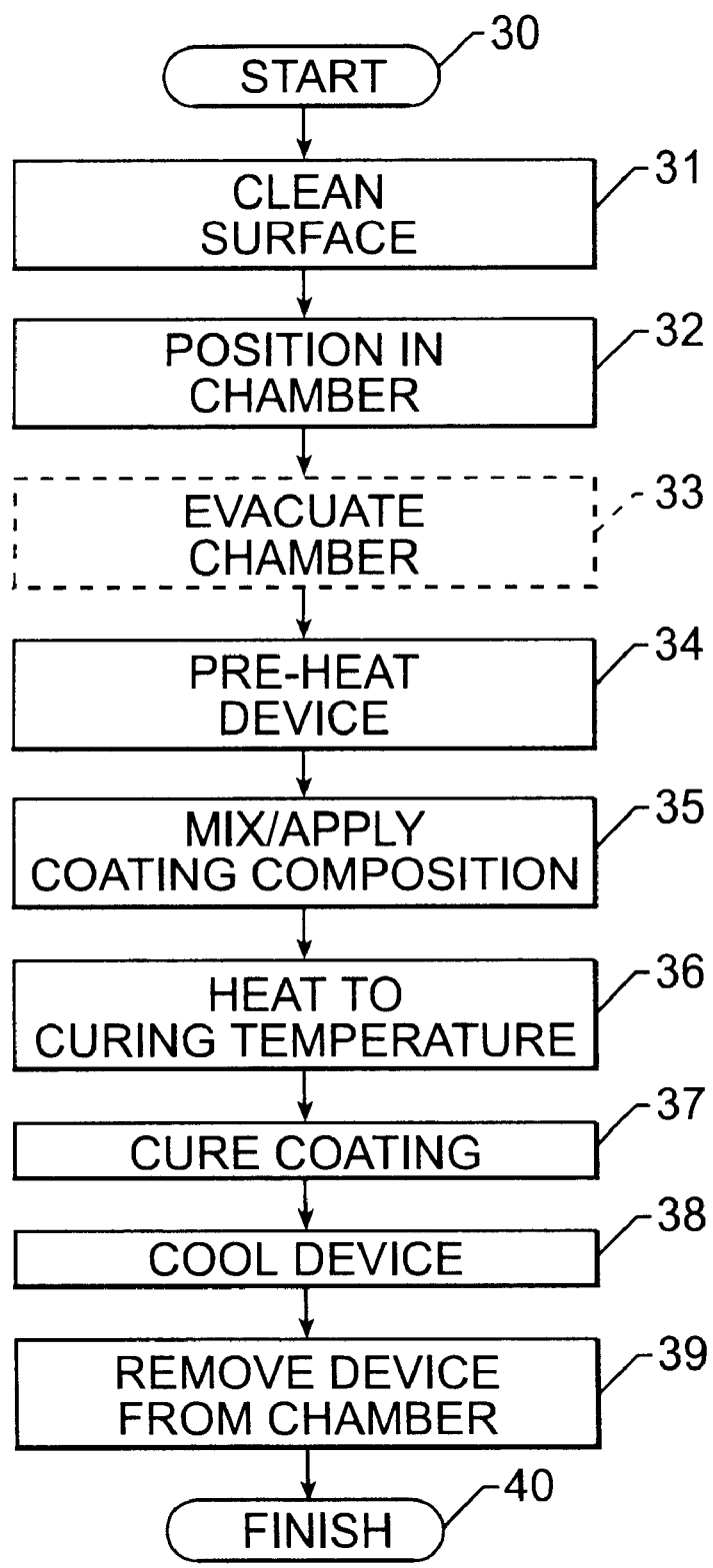
FIG. 1 is a flow diagram illustrating a method for applying a protective coating to an electro-optical component according to the present invention.
Figure 2:
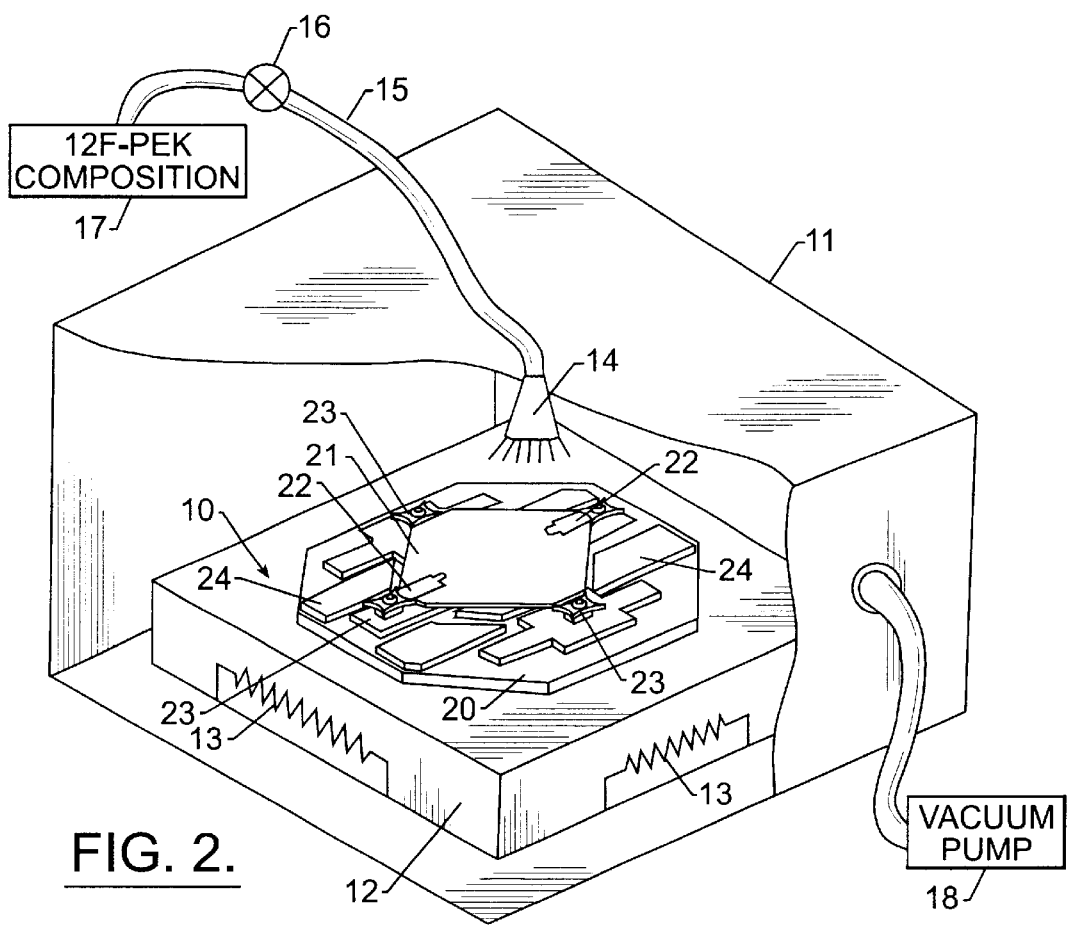
FIG. 2 is perspective view of an electro-optical device being coated according to the method of FIG. 1.

Referring initially to FIGS. 1 and 2, a first method for applying a protective coating to an electro-optical component 10 is first described. The method may commence (Block 30) by cleaning the surface (or surfaces) of the electro-optical component 10 to be coated, at Block 31. An exemplary cleaning method is set forth in Example 1, below. Of course, other suitable cleaning methods may also be used, and the particular cleaning method used may depend upon the specific electro-optical component to be coated, as will be appreciated by those of skill in the art. Also, cleaning may not be required in every application.

Figure 3:
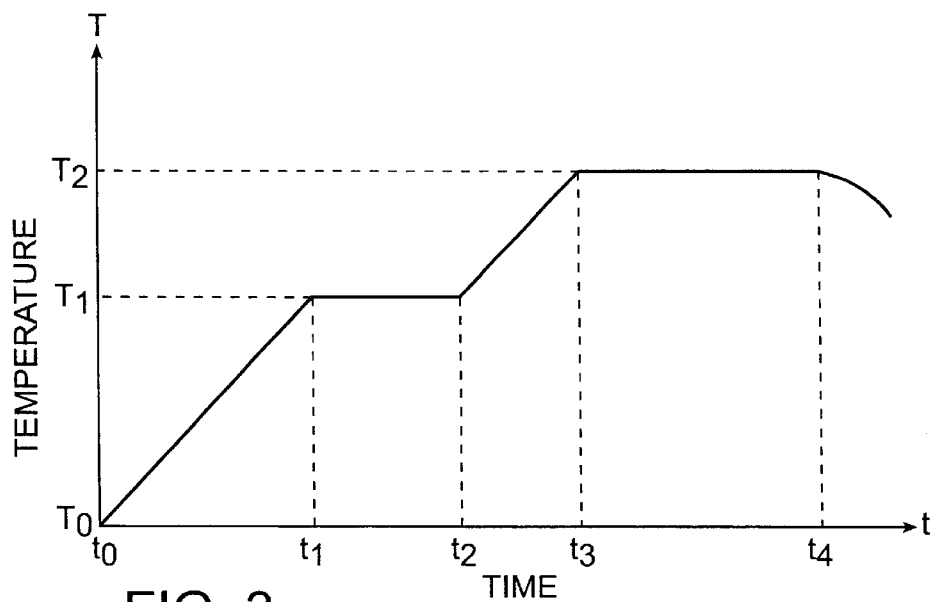
FIG. 3 is a graph of temperature versus time for various steps of the method of FIG. 1.

The electro-optical component 10 is preferably positioned in a chamber 11, such as a vacuum chamber, for example, at Block 32. The above described cleaning may either be performed in the chamber 11 or prior to positioning of the electro-optical component 10 therein. The chamber 11 may include a base 12 for the electro-optical component 10. The base 12 may include heating elements 13, which may be used for pre-heating the electro-optical component 10 (Block 34). Of course, other suitable heating devices may also be used. The electro-optical component 10 is preferably pre-heated until it reaches a temperature $T_1$ at a time $t_1$, as illustratively shown in FIG. 3. For example, the temperature $T_1$ may be in a range of about 25 to 100° C., though other temperatures may also be used. For spray coating in a vacuum, the temperature is preferably in a range of about 70 to 100° C., for example.

The chamber 11 may optionally be evacuated (Block 33) using a vacuum pump 18, for example, to form a vacuum therein. For example, the chamber 11 may be evacuated until it has a pressure of about $1 \times 10^{-4}$ Torr to $1 \times 10^{-3}$ Torr. Here again, the above noted cleaning and positioning steps (Blocks 31, 32) may also be performed before or after the chamber 11 is evacuated. A coating composition may then be mixed and applied to the desired surface(s) of the electro-optical component 10, at Block 35, to form the protective coating thereon. Of course, the coating composition may be made in a pre-mixed form and stored so that mixing is not necessary prior to every application.

As illustratively shown in FIG. 2, for example, the coating composition may be sprayed onto the desired surface(s) of the electro-optical component 10. Applicants have found that performing spray coating in a vacuum advantageously allows conformal coatings about 3 µm thick or less to be achieved. The spray may be provided by a nozzle 14 connected via a hose 15 and controllable flow valve 16 to a container 17 having the coating composition therein, as illustratively shown in FIG. 2. Other suitable coating methods may also be used, such as spin coating, which is well known to those of skill in the art and will not be described further herein. Regardless of the method of application, the coating composition is preferably applied to form a conformal coating on the desired surface(s) at a thickness of less than about 25 µm, though greater thicknesses may also be used in accordance with the present invention.

The coating composition preferably includes a solvent, which facilitates application of the coating composition, fluorinated poly(phenylene ether ketone) ("12F-PEK"), and an anti-reflection agent. The material 12F-PEK has the following chemical formula:

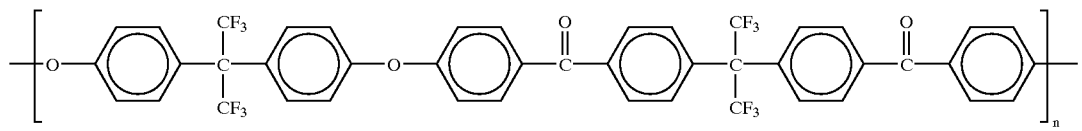

The solvent may include at least one of butyl acetate, for example, and the anti-reflection agent may include at least one of an inorganic salt (e.g., magnesium fluoride), an organofunctionalized additive, or an erbium dopant. More specifically, the coating composition may include about 2 to 8.5% by weight of 12F-PEK and about 1.0 to 6.0% by weight of the anti-reflection agent.

As noted above, 12F-PEK provides improved reliability, non-hermetic sealing, allows for re-working of a component coated therewith, and it is less expensive than many prior art coating compositions. Further, by including the anti-reflection agent in the coating composition, the advantageous properties of 12F-PEK may be used with components such as MOEMS where the natural transparency of 12F-PEK alone may otherwise be insufficient in certain applications.

The electro-optical component 10 may include a substrate 20 and an electro-optical device thereon, such as a MOEMS. The MOEMS may include a mirror element 21, hinges 22 and fasteners 23 for securing the mirror element, and electrodes 24, for example, as illustratively shown in FIG. 2. As such, the surface of the substrate 20 upon which the MOEMS is mounted may be substantially non-planar. For such non-planar surfaces, coating techniques such as spin coating may prove problematic as the coating composition may collect in certain areas. Of course, numerous other electro-optical devices may be used in accordance with the present invention. For example, the electro-optical device may be a vertical-cavity surface-emitting laser (VCSEL), an optical switch, a mirror array, an optic router, an optical wavelength conditioner, an optical transmitter, an optical receiver, an optical transceiver, a laser diode, a holographic grating, a diffraction grating, and lenses such as Fresnel or GREN lenses.

Following the application of the coating composition, the electro-optical component 10 may be heated until it reaches a curing temperature $T_2$ at a time $t_3$, at Block 36, and then cured (Block 37) to remove the solvent and form the protective coating. The curing temperature is preferably about 125° C. or higher, though lower curing temperatures may also be used. The duration of curing (i.e., from time $t_3$ to $t_4$) will depend upon the thickness and composition of the coating composition, as will be appreciated by those of skill in the art. By way of example, for the above range of coating thicknesses, typical curing times may range from about 15 to 45 minutes. The electro-optical device 10 may then be cooled (Block 38) and removed from the chamber 11 (Block 39), concluding the method, at Block 40.

Another method aspect of the invention for re-working the electro-optical component 10 already including a 12F-PEK protective coating thereon. The method may begin (Block 50) by removing the 12F-PEK protective coating, at Block 51, to expose at least one portion of the electro-optical component. An exemplary method for removing the 12F-PEK protective coating is set forth in Example 2, below, although other suitable methods may also be used in accordance with the present invention. Next, the desired work may be performed (Block 52) and the electro-optical component 10 positioned in the chamber 11, at Block 32'.

Figure 4:
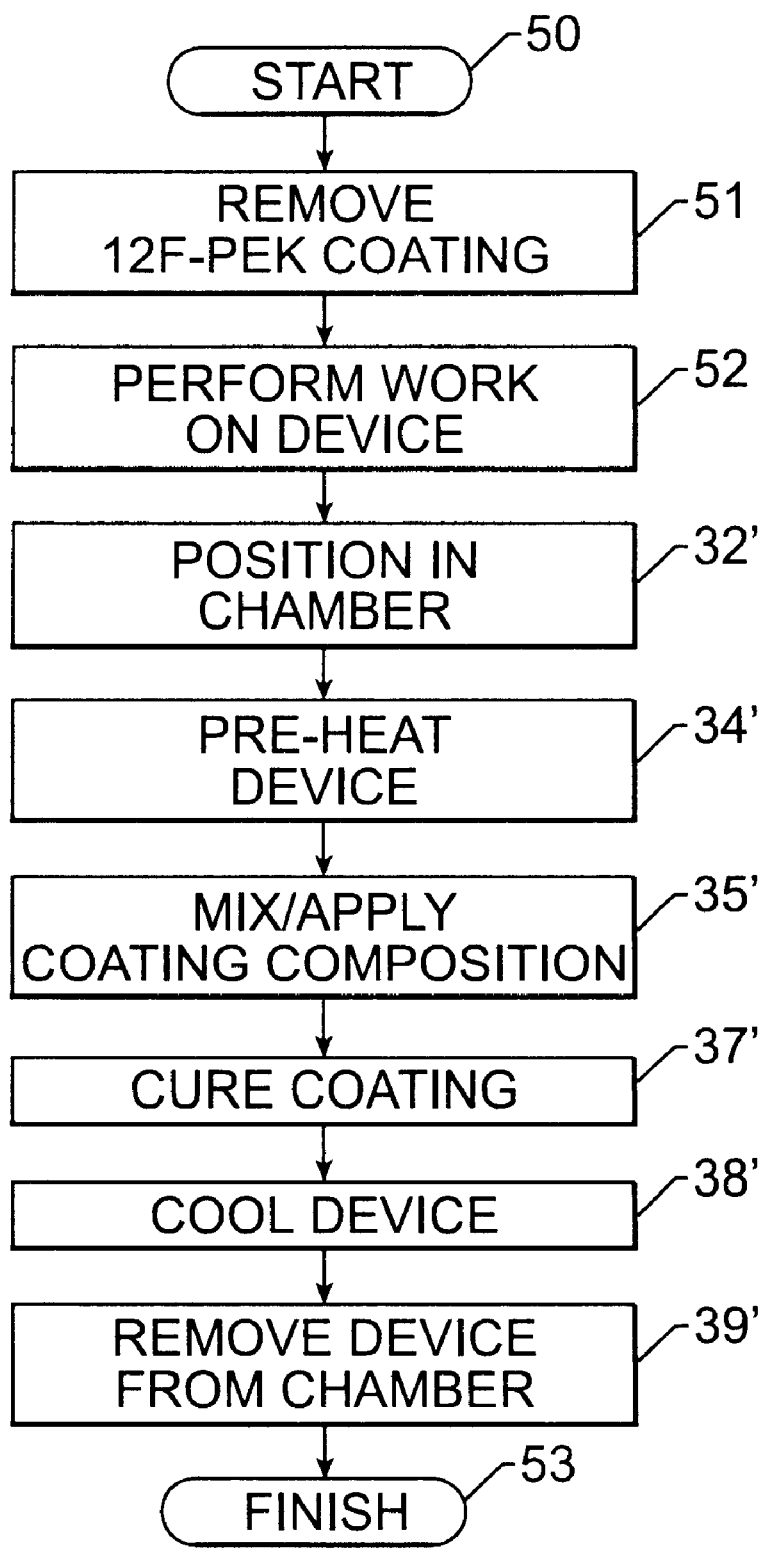
FIG. 4 is a flow diagram of a method for re-working an electro-optical component according to the present invention.

The electro-optical component 10 may then be pre-heated (Block 34') and a coating composition mixed and applied (Block 35'), as described above. Again, the coating composition preferably includes 12F-PEK, and may also include an anti-reflection agent. The coating composition may then be cured (e.g., at the pre-heated temperature $T_1$, as shown in FIG. 4), cooled, and removed from the chamber 11, at Blocks 37'–39', respectively, concluding the method (Block 53).

EXAMPLE 1

12F-PEK Pre-Encapsulation Cleaning Procedure

The following is an outline of a high-reliability, aggressive cleaning procedure for silicon and silicon dioxide electro-optical components:

Materials Used
  a) Two high purity fused quartz tanks (one for an SC-1 cleaning solution and one for an HF cleaning solution)
  b) A182-39MLB teflon PFA wafer carrier
  c) A72-40-03 teflon handle/squeeze
  d) A053-0215 teflon handle/end pick up (for loading carrier into Quartz tanks)

Chemicals Used
  a) Hydrogen Peroxide (30% unstablized, semiconductor grade)
  b) Ammonium Hydroxide (29% semiconductor grade)
  c) Hydrochloric Acid (37% semiconductor grade)
  d) Hydrofluoric Acid (49% semiconductor grade)

Proper Clothing
  Chemical splash goggles
  PVC apron
  Chemical resistant gloves (natural rubber)

Operating Procedure

I. Solution Preparation

Solution preparation includes chemical mixing and corresponding treatment of an SC-1 Organic Clean Solution and an HF (50:1)—HF Dip. It should be noted that the HF Dip may not be required depending on the application.

1. Select two clean 500 ml quartz tanks.
  2. Using DI water, rinse the two quartz tanks. This is done in order to rinse the tanks of residual contaminants before mixing chemicals.
  3. Again, using DI water, fill each respective quartz tank with 250 ml of water.
  4. Turn on the hot plates and heat the water to 85° C.

These steps will take approximately 35 minutes to complete. During heat-up of DI water, preparation of SC-1 chemical solution may started. Also, if the HF Dip solution has not been previously mixed, this should be done. To prepare the solution, follow the procedure outlined in Section B, below.

A. SC-1 Organic Clean Solution

The purpose of this solution is the removal of residual organic and metallic contaminants. This chemical mixture is referred to as SC-1 herein.

1. Prepare a fresh mixture of DI water—ammonium hydroxide—hydrogen peroxide (5:1:1) by combining the following reagents into the quartz tank designated for the SC-1 solution. Add 250 ml of each of the following chemicals to the SC-1 quartz tank.
    a. 5 volumes of DI water—(containing 250 ml of heated DI water)
    b. 1 volume of ammonium hydroxide—50 ml
    c. 1 volume of hydrogen peroxide—50 ml
  2. Reheat the solution to 75–80° C. and maintain this temperature throughout the cleaning process (adjusting the hot plate heater dial periodically if necessary).
  3. Submerge the carrier including the components in the hot SC-1 solution for 10 minutes. Note that any vigorous bubbling which occurs is due to oxygen evolution. The solution should not be boiled to prevent rapid decomposition of the hydrogen peroxide and volatilization of the ammonia.
  4. At the completion of the 10 minute organic cleaning cycle, remove the carrier including the components from the SC-1 tank, rinse with DI water, and proceed to step B.

If two lots are being cleaned, the second lot of components may be inserted into the SC-1 solution at this point.

B. HF (50:1)—HF DIP

The purpose of the HF Dip is to strip the thin hydrous oxide film. Again, this may not be required in certain applications. The chemical solution is hydrofluoric acid—DI water.

1. After completing the organic cleaning process (step A.4, above), submerge the carrier including the components directly into the hydrofluoric acid—DI water (50:1) solution.
2. Allow components to remain in the solution for only 15 seconds.
3. Remove the carrier containing the components from the solution, and rinse the carrier and components with DI water.
4. Bake the components in a clean vacuum oven at 100° C. for 30 minutes.

II. Clean-Up

After the RCA clean is completed, clean-up may be performed as follows:

1. Shut off hot plates.
2. Fill quartz tanks approximately ⅓ full of DI water and rinse.
3. Rinse off any spills and wipe up.
4. Leave work area clean and dry.

III. Emergency Shutdown

In the event an emergency shutdown is required, the following procedure may be used:

1. Shut off hot plates.
2. Insure all chemical bottles are capped.

EXAMPLE 2

12F-PEK Encapsulation Removal Procedure

The following is an outline of a 12F-PEK removal procedure for repair of bare silicon and silicon dioxide electro-optical components Chemicals Used a) Butyl Acetate (100% semiconductor grade or Equivalent)

Proper Clothing a) Chemical splash goggles
b) PVC apron
c) Chemical resistant gloves (natural rubber)

Operating Procedure

I. 12F-PEK Removal

Note that the coating may be removed from bulk encapsulated components or localized component areas.

1. Select 1 clean 500 ml glass tank.
2. Using DI water, rinse the glass tank. This is done to rinse the tank of residual contaminants before mixing chemicals.
3. Fill the glass tank with 250 ml of butyl acetate.
4. Insert 12F-PEK encapsulated component and cover with a watch glass.
5. Turn on the hot plate and bring the butyl acetate to a gentle boil at 124–125° C. under a nitrogen blanket in a fume hood. Note that butyl acetate is a flammable liquid. It is important that no oxygen is allowed to contact boiling butyl acetate. A nitrogen blanket or suitable inert gas may be used.
6. Gently boil the 12F-PEK encapsulated component in butyl acetate until the coating dissolves. This will take approximately 1 hour to complete.
7. Remove component and rinse with uncontaminated butyl acetate.

II. Clean-Up

After the removal procedure is completed, the following clean-up procedure may be followed:

1. Shut off hot plate.
2. Empty and rinse glass tank.
3. Rinse off any spills and wipe up.
4. Leave work area clean and dry.

III. Emergency Shutdown

In the event an emergency shutdown is required, the following procedure may be used:

1. Shut off hot plate.
2. Remove beaker with butyl acetate from hot plate.
3. Insure all chemical bottles are capped.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for applying a protective coating to an electro-optical component comprising:

positioning the electro-optical component in a chamber; and applying a coating composition comprising fluorinated poly(phenylene ether ketone) and an anti-reflection agent to at least one surface of the electro-optical device to form the protective coating thereon.

2. The method of claim 1 wherein applying the coating composition comprises at least one of spray coating and spin coating.

3. The method of claim 1 wherein applying the coating composition comprises applying the coating composition to form a conformal protective coating on substantially the entire at least one surface.

4. The method of claim 1 wherein the anti-reflection agent comprises at least one of an inorganic salt, an organofunctionalized additive, and an erbium dopant.

5. The method of claim 1 wherein the protective coating has a thickness of less than about 25 µm.

6. The method of claim 1 further comprising cleaning the at least one surface prior to applying the coating composition.

7. The method of claim 1 further comprising heating the electro-optical component during applying the coating composition.

8. The method of claim 7 wherein heating comprises heating at a temperature in a range of about 25 to 100° C.

9. The method of claim 1 further comprising curing the protective coating of the electro-optical component in the chamber for a predetermined time and at a predetermined temperature.

10. The method of claim 1 wherein the electro-optical component comprises at least one of a micro-optoelectromechanical system (MOEMS), a vertical-cavity surface-emitting laser (VCSEL), an optical switch, a mirror array, an optic router, an optical wavelength conditioner, an optical transmitter, an optical receiver, an optical transceiver, a laser diode, a holographic grating, a diffraction grating, and a lens.

11. The method of claim 1 wherein the at least one surface is non-planar.

12. The method of claim 1 wherein the coating composition further comprises a solvent.

13. A method for applying a protective coating to an electro-optical component comprising:

positioning the electro-optical component within a vacuum chamber;

evacuating the vacuum chamber; and spraying at least one surface of the electro-optical component with a coating composition comprising fluorinated poly(phenylene ether ketone) and an anti-reflection agent to form the protective coating thereon.

14. The method of claim 13 wherein spraying the at least one surface comprises spraying to form a conformal protective coating on substantially the entire at least one surface.

15. The method of claim 13 wherein the anti-reflection agent comprises at least one of an inorganic salt, an organofunctionalized additive, and an erbium dopant.

16. The method of claim 13 wherein evacuating the vacuum chamber comprises evacuating the vacuum chamber to a pressure of about $1 \times 10^{-4}$ Torr to $1 \times 10^{-3}$ Torr.

17. The method of claim 13 wherein the protective coating has a thickness of less than about 3 μm.

18. The method of claim 13 further comprising cleaning the at least one surface prior to spraying.

19. The method of claim 13 further comprising heating the electro-optical component during spraying.

20. The method of claim 19 wherein heating comprises heating at a temperature in a range of about 70 to 100° C.

21. The method of claim 13 further comprising curing the protective coating of the electro-optical component in the vacuum chamber for a predetermined time and at a predetermined temperature.

22. The method of claim 13 wherein the electro-optical component comprises at least one of a micro-optoelectromechanical system (MOEMS), a vertical-cavity surface-emitting laser (VCSEL), an optical switch, a mirror array, an optic router, an optical wavelength conditioner, an optical transmitter, an optical receiver, an optical transceiver, a laser diode, a holographic grating, a diffraction grating, and a lens.

23. The method of claim 13 wherein the at least one surface is non-planar.

24. The method of claim 13 wherein the coating composition further comprises a solvent.

25. A method for re-working an electro-optical component including a fluorinated poly(phenylene ether ketone) (12F-PEK) protective coating thereon comprising:

removing the 12F-PEK protective coating to expose at least one portion of the electro-optical component; and applying a coating composition comprising fluorinated poly(phenylene ether ketone) (12F-PEK) and an anti-reflection agent to the at least one exposed portion of the electro-optical component.

26. The method of claim 25 wherein applying the 12F-PEK comprises:

positioning the electro-optical device within a vacuum chamber;

evacuating the vacuum chamber; and spraying the electro-optical device with the 12F-PEK.

27. The method of claim 25 wherein applying the 12F-PEK comprises at least one of spray coating and spin coating.

28. The method of claim 25 wherein the anti-reflection agent comprises at least one of an inorganic salt, an organofunctionalized additive, and an erbium dopant.

29. The method of claim 25 wherein the protective coating has a thickness of less than about 25 μm.

30. The method of claim 25 further comprising cleaning the at least one surface prior to applying the coating composition.

31. The method of claim 25 further comprising heating the electro-optical component during applying the coating composition.

32. The method of claim 25 wherein heating comprises heating at a temperature in a range of about 25 to 100° C.

33. The method of claim 25 further comprising curing the protective coating of the electro-optical component in the chamber for a predetermined time and at a predetermined temperature.

34. The method of claim 25 wherein the electro-optical component comprises at least one of a micro-optoelectromechanical system (MOEMS), a vertical-cavity surface-emitting laser (VCSEL), an optical switch, a mirror array, an optic router, an optical wavelength conditioner, an optical transmitter, an optical receiver, an optical transceiver, a laser diode, a holographic grating, a diffraction grating, and a lens.

35. The method of claim 25 wherein the coating composition further comprises a solvent.

36. An electro-optical component comprising:

a substrate and at least one electro-optical device thereon; and a protective coating on said substrate and said at least one electro-optical device comprising fluorinated poly (phenylene ether ketone) and an anti-reflection agent.

37. The electro-optical component of claim 36 wherein the anti-reflection agent comprises at least one of an inorganic salt, an organofunctionalized additive, and an erbium dopant.

38. The electro-optical component of claim 36 wherein the protective coating has a thickness of less than about 3 μm.

39. The electro-optical component of claim 36 wherein the at least one electro-optical device has a non-planar surface, and wherein the protective coating substantially covers the non-planar surface.

40. The electro-optical component of claim 36 wherein the electro-optical device comprises at least one of a micro-optoelectromechanical system (MOEMS), a vertical-cavity surface-emitting laser (VCSEL), an optical switch, a mirror array, an optic router, an optical wavelength conditioner, an optical transmitter, an optical receiver, an optical transceiver, a laser dode, a holographic grating, a diffraction grating, and a lens.

41. A coating for an electro-optical component comprising:

a solvent;

fluorinated poly(phenylene ether ketone); and an anti-reflection agent.

42. The coating of claim 41 wherein said anti-reflection agent comprises at least one of an inorganic salt, an organofunctionalized additive, and an erbium dopant.

43. The coating of claim 41 wherein the coating comprises about 2.0 to 8.5% by weight of the fluorinated poly(phenylene ether ketone) and about 1.0 to 6.0% by weight of the anti-reflection agent.

* * * * *